May 28, 1946.  J. E. DUBE  2,401,144
PRESSURE REGULATOR VALVE
Filed Jan. 2, 1941
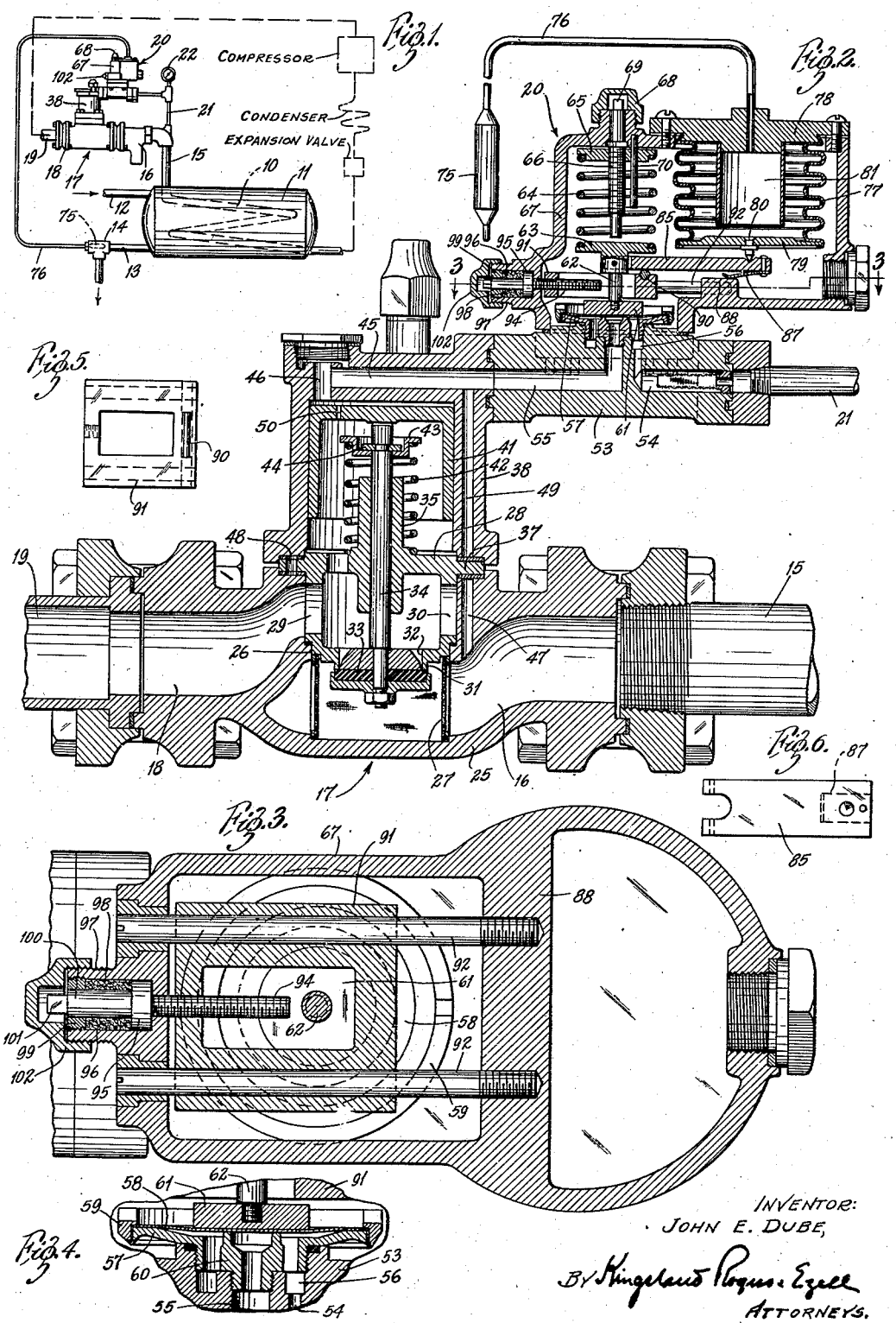
INVENTOR:
JOHN E. DUBE,
By Kingsland Rogers Ezell
ATTORNEYS.

Patented May 28, 1946

2,401,144

UNITED STATES PATENT OFFICE 2,401,144

PRESSURE REGULATOR VALVE

John E. Dube, Clayton, Mo., assignor to Alco Valve Company, Maplewood, Mo., a corporation of Missouri Application January 2, 1941, Serial No. 372,708

6 Claims. (Cl. 62—127)

The present invention is an improvement in a pressure regulator valve, and more particularly in a valve of this type controlled by a thermostatic device or pressure-responsive means.

In general, the mechanism includes a main valve adapted to be employed in a pipe line such as a line between the evaporator and the compressor in a refrigeration system. This main valve has a member attached to it movable in response to pressure changes. The pressure side of this member is connected through a pilot valve to a point the pressure of which is to be employed to control the main valve. The pilot valve is designed to be controlled by pressure in the line acting against a counterpressure that is a resultant of a predetermined pressure resistance and a pressure resistance due to temperature conditions.

Among the objects of the invention are to provide a regulator responsive to temperature and pressure combined; to provide a regulator responsive to variations in load conditions producing temperature changes, as well as pressure changes; and to provide a regulator establishing a critical pressure for its operation with means automatically to vary that critical pressure upon temperature changes.

Specific objects include provision of a pressure responsive device having means producing a counterpressure, and temperature responsive means to vary the counterpressure. With particular regard to a refrigeration system, an object of the invention is to produce a pressure responsive control acting by effecting a counterpressure, and temperature responsive means to increase this counterpressure upon decrease of temperature at the expansion coils. Even more particularly, it is an object to provide a control system for use in maintaining a minimum pressure in the evaporator, and to reduce that minimum pressure upon rise of temperature of a chosen point in which a temperature responsive member is located. A particular object is to provide in such a device a means to adjust the sensitivity of external pressure or temperature responsive means, such as the bellows, in changing the pressure setting of the regulator, such that the amount of change in pressure per degree of temperature change may be nicely controlled.

Further objects include providing the foregoing mechanism with a single sealing moving element with no sealing moving joints; to provide ready and sensitive adjustments for the pressure and temperature means; and to provide such other properties as appear from the following description.

In the drawing:

Fig. 1 is a more or less schematic view of the pertinent portions of a refrigeration system with the valve of the present invention therein;

Fig. 2 is a vertical medial section of the valve;

Fig. 3 is a horizontal section taken on the line 3—3 toward the upper part of Fig. 2 showing an adjustment means;

Fig. 4 is an enlarged view of the pilot valve and its seat;

Fig. 5 is a plan view of the fulcrum support for the pilot valve operating mechanism; and, Fig. 6 is a plan view of the pilot valve operating lever.

The device may be illustrated in connection with a refrigeration system, though its principles are obviously broader.

The pertinent portions of the refrigeration system include an evaporator coil 10 adapted to cool the contents of a container 11, which may be a brine tank. The container has an inlet pipe 12 and an outlet pipe 13. The outlet pipe is provided with a T 14 for a purpose to be described.

The coil 10 has a line 15 connected to an inlet side 16 of a main valve generally designated at 17. From the outlet side 18 of this valve there extends a suction pipe 19 leading to the compressor. The system includes the usual compressor, condenser and expansion valve, as indicated, the last being attached to the coil 10.

The pilot valve is generally indicated at 20. A pilot tube 21 leads from a point in the pipe 15 suitable for pressure control. A pressure gauge 22 may be employed in this pilot line if desired.

The main valve 17 includes a valve body 25 with a circular valve seat-receiving portion 26 in the usual partition wall between the inlet 16 and the outlet 18. A cylindrical filter 27 is disposed in the inlet portion of the valve body.

A valve seat member 28, circular in shape, engages snugly within the valve seat-receiving portion 26, and extends upwardly through a circular opening provided in the upper wall of the valve body 25. This valve seat portion has a plurality of ports 29 and 30 adapted to register with the outlet portion of the valve housing.

The valve seat member 28 has below the ports a circular valve seat 31 surrounding a valve passage 32 which is thus disposed between the inlet and outlet portions of the valve body member 25. A valve 33 engages the valve seat 31 to close thereagainst and to cut off communication through the valve. This valve has a central restriction plug fitting fairly closely within the passage 32, which is tapered and permits only small flow through the passage until the valve opens wide.

The valve 33 is mounted on a stem 34 that extends through a central circular guide column 35 extending above and below the circular and ported top or upper part of the member 28. A circular continuation 37 of the top forms a flange extending outwardly from the member 28 to be clamped between the top of the valve body 25 and a cylindrical housing 38 employed for a purpose to be described. The fastening means, which usually are machine screws, are not shown.

The housing 38 constitutes a cylinder receiving a well-fitting skirted piston 41 therein. The skirt of this piston extends down over the valve rod 34 which engages against the underside of the piston head.

The valve rod 34 is maintained against the piston by a coil spring 42 that surrounds the tubular guide 30 and engages at one end against the top portion of the member 28. It also engages at its upper end against a cupped washer 43 held to a maximum upper position on the valve rod by a washer 44 secured in a neck on the rod. The spring 42, therefore, urges the valve 33 toward its closed position, correspondingly urging the piston 41 upwardly. The spring is relatively light, and is designed merely to close the valve upon equalizing of pressure above and below the piston.

The cylinder 38 has a passage 45 extending across the cylinder head and meeting a vertical passage 46 leading to the piston. A vertical passage 47 extends from the inlet side 16 of the valve housing 25 to the flange 37. A continuation 48 of the passage 47 is formed in one portion of the flange 37 but there is no corresponding continuation diametrically opposite. Within the cylinder there is a further continuation 49 extending to the passage 45. As shown in the drawing, the member 28 has been turned so that the port 48 is out of registry with the two passages 47 and 49 which are thereby cut off. Upon turning the member 28 180°, the port 48 may be made to register with the passages 47 and 49. This may be used when it is desired to bypass the pilot valve and operate the main valve directly from inlet pressure.

The cylinder head has a bleeder port 50 therethrough.

From the description thus far, it may be seen that gas under pressure flowing through the ports 45 and 46 to the upper side of the piston 41 may force the piston downwardly against the combined action of the spring 42 and the evaporator pressure acting beneath the valve 33, to open the main valve, when the quantity of gas flowing in sufficiently exceeds that escaping by bleeding out.

The control of the flow through the port 45 is brought about by the pilot valve 20. This pilot valve has a valve base 53 with an inlet 54 and an outlet 55, the former being connected with the line 21 and the latter registering with the port 45 in the cylinder head of the main valve. The valve base 53 is secured to the cylinder 38 by any suitable means, not shown.

The inlet 54 terminates in an annular groove 56 in the upper side of the valve base 53. This groove has threaded and sealed therein a skirted diaphragm holding member 57, with a diaphragm 58 secured between it and a ring 59 attached to the member 57 as by welding. A valve seat 60 is threaded into the upper part of the outlet passage 55 and is adapted to be engaged by the diaphragm under pressure of a pressure member or buffer plate 61.

The valve, comprising the diaphragm 58 acted on by the buffer plate 61, thus controls communication between the inlet and the outlet pilot lines. The diaphragm seals off the space above it from that below it.

The buffer plate 61 is attached to a stem 62, to the upper end of which is secured a head 63 urged into seating position by a coil spring 64 that in turn engages another head 65 threaded about an adjusting screw 66 secured in a casing 67. The screw 66 is rotatably mounted in the casing 67, but has a shoulder limiting its upward movement under the influence of the spring. A cap 68 is threaded onto the casing 67 to enclose and protect a squared head 69 on the upper part of the screw 66. A pin 70 is secured on the underside of the casing 67 and passes through the head 65 to permit axial movement thereof along the screw 66, but to prevent rotation.

Rotation of the screw 66 by means of a tool applied to the head 69 will obviously adjust the initial compression of the spring 64 and hence the pressure resisting opening of the pilot valve.

There is provided a thermostatic control acting on the pilot valve. It includes a bulb 75 secured within the aforementioned T-connection 14 on the brine outlet pipe 13. This bulb is connected by a tube 76, preferably capillary, to the interior of a collapsible bellows 77 that is secured to the underside of a cap plate 78 attached to the casing 67 of the pilot valve. A head 79 encloses the lower end of the bellows 77 and has extending therefrom an actuating pin 80 of the knife-edged or of the point-contact type. A cylinder 81 secured to the underside of the cap 78 inside the bellows is adapted to limit the collapse of the bellows by engagement therewith of the head 79. A suitable liquid that exerts greater pressure upon temperature increase is put into the bulb.

The actuating point 80 engages the outer end of a lever 85, the inner end of which is forked (Fig. 6) and straddles the hub on the head 63 of the buffer plate stem 62. A pivot pin passes through the head 63 and the bifurcations of the lever 85 to provide pivotal connection between the lever and the head. At the outer end of the lever a leaf spring 87 acts against a boss 88 extending upwardly from the bottom of the casing 67 of the pilot valve. This spring maintains the outer end of the lever 85 against the pin 80. The spring 64 causes the inner end of the lever 85 to move downwardly as far as is permitted by either the condition of the bellows or by the seating of the valve.

A movable fulcrum is provided for the lever 85. This fulcrum consists primarily in a cylindrical pin 90 secured to the upper surface of a hollow rectangular bracket 91 (Figs. 3 and 5) supported on two slide rods 92 threaded into the boss 88 at one end, and passing through the casing 67 at their outer end, more particularly as shown in Fig. 3. For moving the bracket 91 along the rods 92 there is provided an adjusting screw 94 having a flange 95 engaging against the innermost portion of a cylindrical opening 96 in a boss 97 extending from the casing 67 to limit its inward movement. Packing 98 is maintained against the flange 95 by a cap 99 threaded into the opening 96. The screw 94 has an outer portion 100 extending outwardly from the flanged portion 95 and having a squared head 101 adapted to be engaged by a suitable adjusting tool, preferably the one that engages the head 69 on the adjusting screw 66. A cap 102 is threaded onto the boss 97 to protect the head 101. The packing 98 prevents outward movement of the screw 94.

It will be seen that adjustment of the screw 94 moves the fulcrum pin 90 to different positions along the lever 85 and thereby changes the leverage of the connection between the bellows and the valve, and alters the effective force of the thermostatic control, as applied in opposition to the spring. The spring may be adjusted independently of the adjustment of the fulcrum.

The operation of the device is as follows:

The pilot valve is adapted to be opened when the pressure in the line 15, and hence in the pipe 21, attains a predetermined value, and when also the temperature of the brine coming from the tank 11 rises to a predetermined value. When this pressure in the pipe 21, acting on the lower side of the diaphragm 58, is adequate to overcome the resistance of the buffer plate 61, which resistance is a resultant of that produced by the spring 64 and the bellows, the diaphragm will be lifted. This valve need open only a very slight amount to permit the flow of the pilot gas from the inlet 54 around the valve seat 60 to the outlet 55 and thence by passages 45 and 46 to the upper side of the piston 41. This pressure will be sufficient to overcome the combined force of the light spring 42 and the force of the evaporator pressure acting upon valve 33, so that the piston will be forced downwardly, opening the main valve 33 and permitting the main body of the refrigerant gas to pass from the inlet 16 through the valve to the outlet 18 and to the compressor.

When subsequently the pressure in the evaporator is reduced, as by a reduction of refrigerating load, the pilot valve will be closed. A certain amount of fluid under pressure will be enclosed within the passages 55, 45 and 46, and also above the piston. This fluid, however, flows through the small bleeder port 50 in the piston head, and leaks out through the ported member 28 into the outlet 18, so that the main valve thereupon closes under the influence of the spring 42.

It will be seen that the present device comprises not only a pressure regulator with the desired functions thereof, but also a temperature control and a combination of temperature and pressure regulation, wherein the operation of a main control becomes dependent upon pressure, temperature, and a combination of them.

To illustrate its uses, there may be considered a refrigeration system subject to varying loads or refrigerating demands.

In a refrigerating system, there exists a certain pressure in the evaporator coils, as coils 10. When this pressure, passing through the line 21, acts upon the diaphragm 58 with whatever predetermined force is necessary to overcome the resultant force of the spring 64, the diaphragm will be forced off the seat 60, opening the pilot valve, and as described ultimately opening the main valve 33 permitting flow of the refrigerant back to the compressor.

Assuming unchanged temperature at the bulb 75, any reduction of this pressure of a substantial amount, will cause the pilot valve to close, and ultimately the main valve also. The pilot valve maintains the desired minimum pressure. It will be shown that the temperature control varies this minimum pressure in response to temperature changes.

Furthermore, if the refrigeration load changes, as by decreasing, the refrigeration capacity of the coils 10 at the aforementioned pressure, could become excessive. It would reduce the temperature of the medium being cooled, as the brine in the tank 11, to a point where it might freeze, an obviously unfavorable condition. In the present mechanism, this cooling will influence the fluid in the bulb 75, reducing the pressure in the bellows 77, and in turn, by reducing the counter force of the bellows on the spring 64, increase the resultant pressure upon the diaphragm 58. Consequently a greater pressure is required underneath the diaphragm to cause opening of the pilot valve and subsequent opening of the main valve. Thus the pressure in coil 10 will rise after lowering of temperature of bulb 75. This higher evaporator pressure in time reduces the coil capacity for the given load, thus preventing freezing for example.

The foregoing illustration of one use of the device demonstrates that it is a combined temperature and pressure control.

The particular operating values are adjustable. The pressure of the spring 64 is determined by the setting of the screw 66. The counter pressure exerted by the bellows is determined by the setting of the screw 100, that adjusts the fulcrum 90 of the lever 85.

It will be observed that the maximum back pressure resisting opening of the pilot valve, is the full pressure of the spring 64, uninfluenced by the bellows. This value is the maximum critical pressure, and could obtain, for instance, when the bulb is so cold that the bellows is contracted as far as a point free of pressure upon the lever.

Upon increase of temperature of the bulb, the counterpressure of the bellows increases, and is applied against the spring with an effect that is a function of the leverage, which in turn is determined by the position of the fulcrum. Thus, if for a given setting of the fulcrum, there is a certain reduction of spring pressure per degree of rise of temperature, a decrease in the distance from the fulcrum to the point 80 will produce an increase of reduction per degree of rise. It may be noted that the liquid employed in the bulb or bellows is one that assumes a partly liquid and partly vapor state during the operation, so that for any given temperature it produces a determined pressure.

Usually it is desirable to operate at a range wherein the bellows exerts some pressure at the minimum operating temperature. If the rate of change or sensitivity is improper at such setting, the fulcrum may be adjusted in or out by the screw 94. This alters the pressure of operation at the particular point, because the pressure already exerted by the bellows is rendered more or less effective. This change, then, while securing the proper rate of change, or sensitivity, has altered the pressure setting at the desired point. But the pressure setting may then be restored by adjustment of the screw 66. Thereafter, the desired operating pressure and desired rate of change of pressure may be obtained.

It will be seen that the device has both temperature and pressure acting upon a single valve, and that this valve is formed by a single sealed element, the diaphragm requiring no movable sealed joints. The diaphragm seals off the chamber including the spring and bellows, so that pressure changes are not present therein.

The members of the main valve operating structure are designed to have enough friction so as to be reluctant to respond to minor momentary pressure impulses. The mechanism modulates in its preferred form upon general pressure changes. The main valve 33 has a portion extending into the valve passage 32, which limits flow as the valve cracks, and reduces a tendency to snap open. And obviously the piston area is greater than that of the valve seat area, so that the force acting to open the valve may exceed that acting to maintain it closed.

What is claimed is:

1. In a mechanism of the kind described, a line adapted to contain fluid under pressure and adapted to produce refrigeration, a main valve in the line to control flow therethrough, pressure responsive means to actuate the main valve including a fluid pressure line, a pilot valve in the fluid pressure line adapted to be actuated when the pressure attains a critical value, power means to move said pilot valve, said power means being adjustable to change said critical value, and heat responsive means adapted to act in opposition to the power means to reduce said critical value upon rise in temperature where the refrigeration is produced.

2. In a mechanism of the kind described, a main valve, a piston for actuating the valve, a cylinder for the piston, bleeder means from the cylinder to the outlet side of the main valve, a fluid pressure line to the cylinder, a pilot valve in the pressure line, said pilot valve including a valve seat and a diaphragm, an inlet and an outlet port on the same side of the diaphragm but separated by the valve seat, a casing, a plunger therein adapted to force the diaphragm onto the valve seat, said plunger being on the other side of the diaphragm, an adjustable spring in the casing acting on the plunger, a bellows in the casing having a bulb connected therewith, a lever between the bellows and the plunger, a fulcrum for the lever, said fulcrum being mounted on a support member, tracks on the casing to hold the support member, a screw extending to the outside of the casing and adapted to displace the support member along the tracks and adjust the fulcrum of the lever.

3. In a mechanism of the kind described for use in a refrigeration system including an evaporator for cooling a given medium and a refrigerant conducting line connected into the evaporator, the combination of a valve in said line, pressure-responsive means including a pressure element normally applying force to close the valve and an opposing pressure-responsive means subjected to pressure in the line to effect opening of the valve when said line pressure exceeds pressure of the pressure element, temperature responsive means operable in response to increase in temperature of the medium being cooled to reduce the closing force of the pressure element on the valve as said temperature increases, and means to adjust the amount of reduction of said last-named force, produced by the temperature responsive means per unit change in temperature.

4. In a mechanism of the kind described, a pressure line, a valve controlling the line, a pressure chamber connected to the line ahead of the valve, an expansible wall in the chamber movable in response to pressure changes therein, the valve being connected to the expansible wall to be moved thereby, an adjustable spring acting in opposition to the expansible wall, said spring urging the valve toward a first position, means to stop the valve in said first position, a lever connected to the valve, an adjustable fulcrum for the lever, a heat responsive device including a member movable in one direction in response to increase in temperature, said last-named member being adapted to abut the lever, and to pivot the same in a direction to oppose the spring, and being disconnected from the lever so as not to move the same when the temperature decreases.

5. In a refrigerating system having a fluid pressure line, a cut-off adapted to control fluid flow in said line, means subjected to fluid pressure ahead of the cut-off and adapted to operate the cut-off in one direction in response to increase in said fluid pressure, a first yieldable force means, means applying the force of the first force means to oppose operation of the cut-off by the fluid pressure, and mechanism including a second variable yieldable force means automatically operable in response to predetermined temperature conditions to produce varying forces that are functions of said temperature conditions, said mechanism being adapted to apply a force in one direction only in opposition to that produced by the first force means to reduce the force thereof upon the cut-off, said mechanism being incapable of producing a force in the other direction to increase the force of the first force producing means in said other direction.

6. In a refrigerating system, a refrigerant control valve adapted to control refrigerant flow in a refrigerant line in the system, pressure controlled mechanism to operate the valve comprising a movable means subjected to variable fluid pressure that increases as a function of a need for increased refrigerant flow and movable in response thereto, and said mechanism also having a yieldable means acting to apply a force to said movable means to oppose the fluid pressure thereon and close said valve, the pressure controlled mechanism being adapted to operate the valve toward open position in response to increase in the variable fluid pressure operating upon the movable means, and to permit said yieldable means to close said valve upon reduction of said fluid pressure, additional means automatically operable in response to predetermined temperature conditions to move in opposite directions and to produce varying forces that are functions of the said temperature conditions, and a connection, including abutting parts, between said additional means and the valve to apply force in one direction only to the valve when the additional means moves in one direction, to override the force of one of said means of the pressure controlled mechanism, and said additional means being adapted to separate the abutting parts in said connection upon movement in the opposite direction, said separation preventing the additional means from increasing the force of the means it is adapted to override.

JOHN E. DUBE.